Patented Oct. 21, 1947

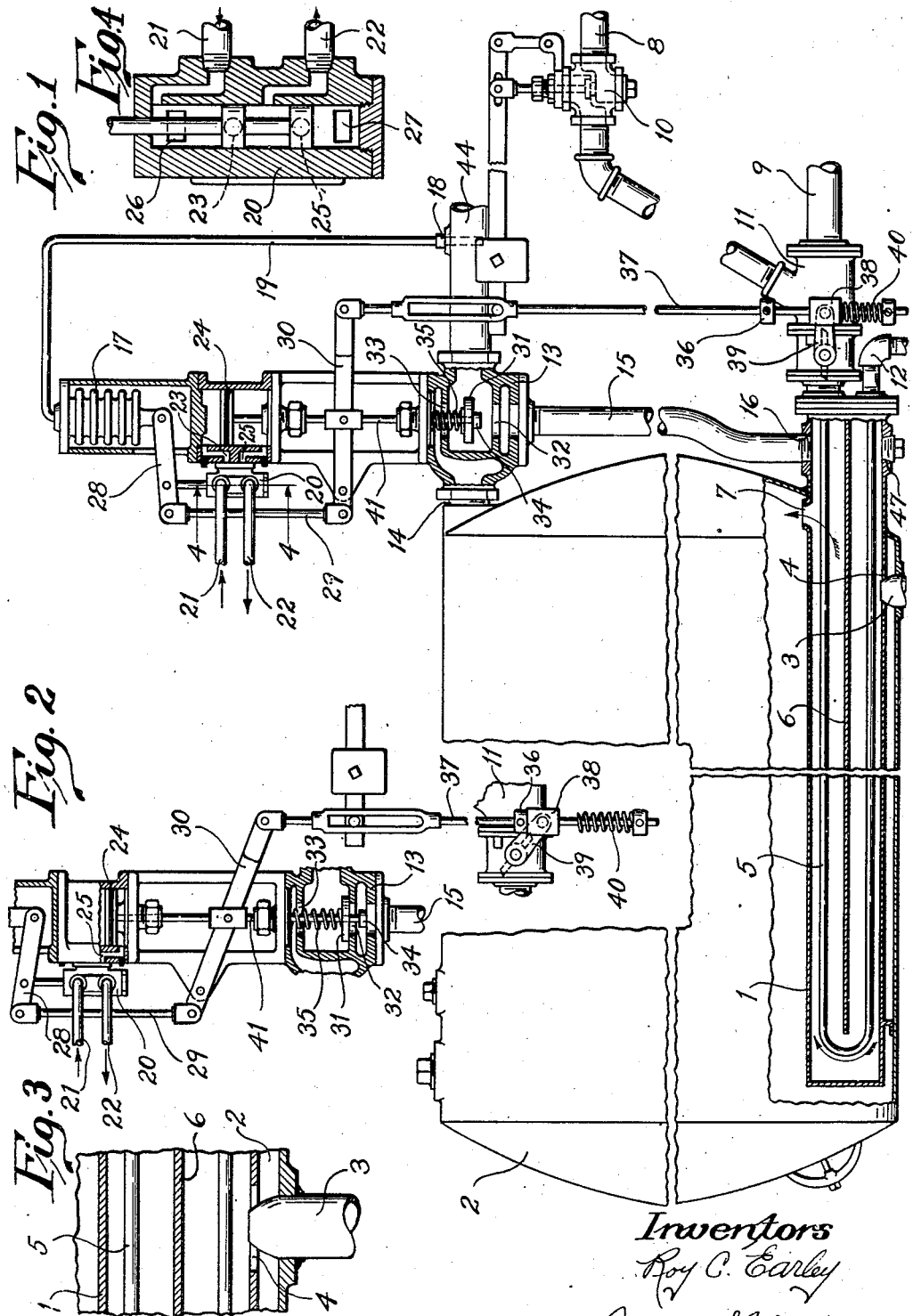

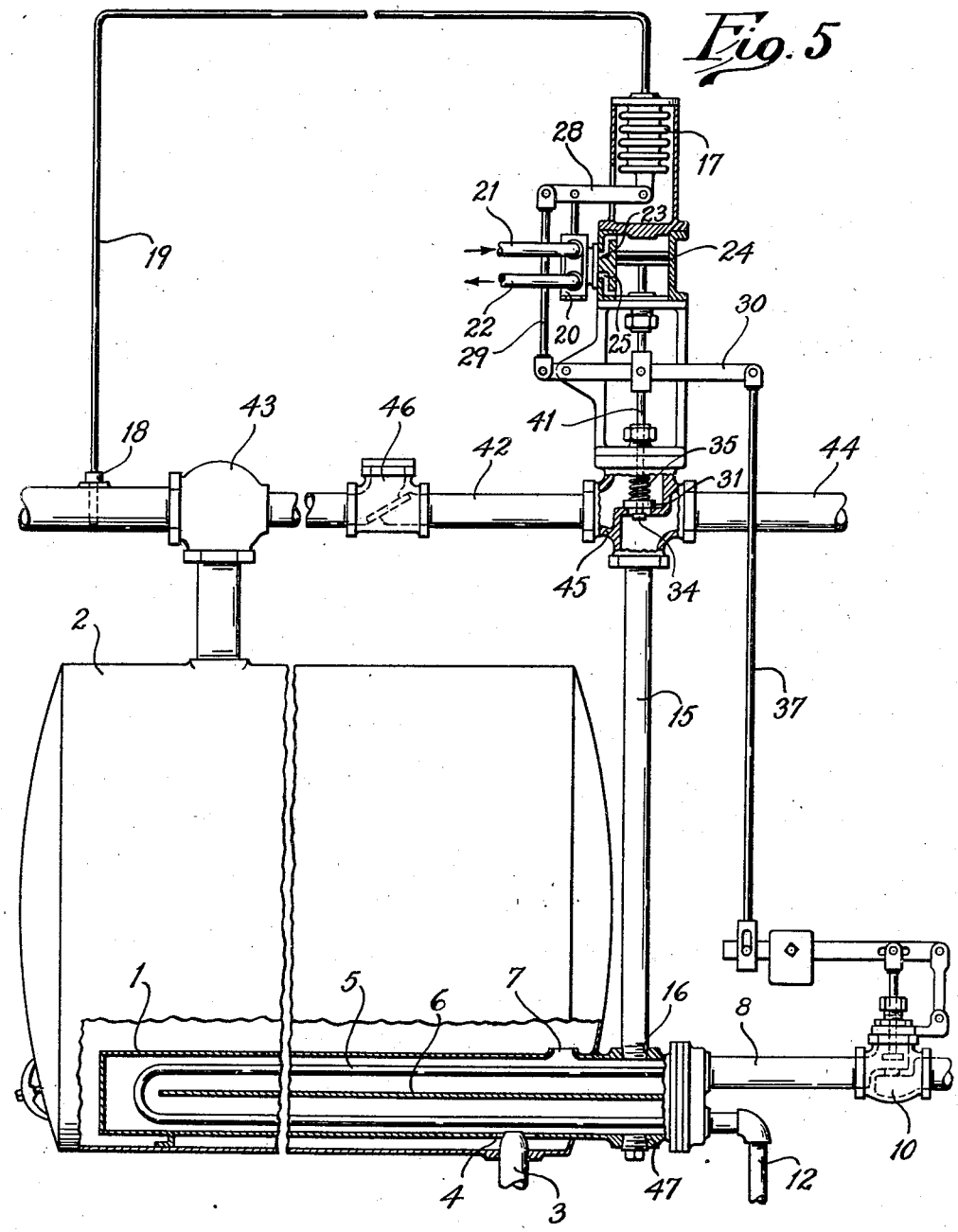

2,429,408

UNITED STATES PATENT OFFICE 2,429,408

HOT-WATER SYSTEM AND CONTROL THEREFOR

Roy C. Earley and James L. Kimball, Danvers, Mass., assignors to Ruggles-Klingemann Mfg. Co., Salem, Mass.

Application March 13, 1946, Serial No. 653,971

15 Claims. (Cl. 257—2)

This invention relates to apparatus for steam heating of water or other liquids in what is known as a heat exchanger and in particular to controlling means for maintaining uniform temperature of the heated water.

One of the objects is to place the heat exchanger within the shell of a water storage tank in order that heat radiation from the shell of the heat exchanger be absorbed into the water within the storage tank.

Another object is to provide a system whereby water of different temperatures can be supplied from the same heating apparatus.

A further object is to provide means whereby the two temperatures can be blended together as required to maintain uniform temperature.

Another object is to selectively control both high and low pressure steam supply to the heater, the high-pressure steam being supplied only in case the low pressure fails to meet the demand.

Other objects relate to novel control means for mixing water of different temperatures and control of the steam supply to the heat exchanger.

Further objects of the invention will become apparent as the description thereof proceeds. A clear conception of the embodiments of the invention may be had by referring to the drawing accompanying and forming part of this specification in which like reference characters designate the same or similar parts in the several views.

Fig. 1 represents a combination of a storage tank and heat exchanger generally referred to as an instantaneous heater, together with the control equipment therefore, the tank and heater being broken away for convenience of illustration.

Fig. 2 represents another view of the control equipment operated to one of its extreme positions.

Fig. 3 represents an enlarged view of the cold water inlet nozzle where it enters the heater shell.

Fig. 4 is a sectional elevation of the pilot control valve.

Fig. 5 shows an elevation, parts being in section of another embodiment of the invention.

Referring to Fig. 1, an instantaneous heater having a shell 1 extends into a storage tank 2, a cold water inlet nozzle 3 extends through the shell of the storage tank 1 and enters an aperture 4 in the shell of the heater. Return bend steam heating coils 5 extend into the shell of the heater, the upper and lower extensions of which are separated by a baffle plate 6. The flow of water through the heater being counter current to that of the steam in the heating coils. Hot water enters the tank through aperture 7. Steam to the heating coils are supplied from two sources, namely, high pressure line 8 and low pressure or exhaust steam line 9. Both of these steam lines are supplied with control valves, the high pressure line at 10, and the low pressure line at 11.

A drip pipe 12 takes away condensation to a steam trap or other receptacle. A three-way mixing valve 13 has conduit connections 14 to the top of the storage tank and conduit connection 15, connecting to the upper side of the heater shell at 16, outside the storage tank. The operation of this valve will be explained later.

The main idea is to be able to get hot water quickly, as when steam is first turned on the heater, but also to provide a storage capacity when the supply of steam exceeds the demand for hot water, this object being accomplished by drawing the entire demand direct from the heater when necessary to maintain a temperature corresponding to a thermostat setting located in the hot water delivery line, and at other times drawing a part of the supply from the heater and a part from the storage tank, or drawing the entire supply from the storage tank if the temperature of the stored water corresponds to the setting of the thermostat.

The operation of a novel arrangement of thermostatically operated control equipment for accomplishing these objects will now be explained. Thermostatic bellows 17, having thermostatic bulb 18, and connecting capillary tube 19, constitute a thermostat of the conventional type for operating a pilot valve 20, for controlling a source of fluid under pressure for operating a servomotor.

Pilot valve 20 is of the usual type for the control of fluid pressure operated servomotors, it has inlet at 21 and exhaust at 22. A port 23 registers with the passage leading to the top of piston 24 and port 25 is to the bottom of the cylinder under piston 24. Arrangement of inlet and outlet can be reversed when required by reversing the passages to the servomotor cylinder. A passage is provided in the body of the pilot valve extending from 26 at the top to 27 at the bottom. The operation of the servomotor is what is commonly referred to as a follow-up control, that is to say, it operates over a rising and falling scale effecting a proportional characteristic to changes in the system under control, this is accomplished by a return motion to a neutral position causing a further operation of the actuating means for a further operation of the servomotor. In this case this is accomplished through the operation of a floating lever 28 and link 29 operated from lever 30 which lever is in turn operated from piston 24 of the servomotor. This lever also serves to operate both the high and low pressure steam supply valves to the heater. At the lower end of valve stem 41 is a valve disc 31 which controls the flow of water through orifice 32 and 33. This disc is slideably mounted on stem 41 and is biased downwardly against a collar 34 by means of a spring 35. The object of this arrangement is to allow steam valve 11 to close, following the closing or orifice 32. (See Fig. 2.)

We will now explain the operation of the apparatus as a whole and the cooperating effect of the various elements in establishing economical control over a hot water system. Assuming that steam, both high and low pressure, is turned on to the heater, the water in the storage tank being of a temperature less than the setting of the thermostat, in such a case, orifice 33 will be closed by the valve disc 31, high pressure steam valve 10 and low pressure steam valve 11 will be open. As soon as the temperature of the water at thermostat 18 reaches the low end of the range of operation of the control the servomotor will operate to move valve disc 31 downward, drawing some of the water supply from the storage tank. A further increase in temperature will move the valve disc 31 further downward, drawing more water from the storage tank and also cutting off the high pressure steam supply. From this point on, the control is entirely from the low pressure supplied through valve 11. Now assuming a further increase in temperature then valve disc 31 will close orifice 32 and the entire supply of hot water will be drawn from the storage tank. At this point of the operating range, a collar 36 on rod 37 will have contacted with swivel block 38 on valve arm 39 and thereafter any further increase in temperature will cause valve stem 41 to slide through valve disc 31 and close the low pressure steam valve 11. The position of the control being substantially as shown in Fig. 2.

It will be understood that on a falling scale of the temperature, the mode of operation is reversed, valve 11 first opening followed by the mixing valve and lastly, the high pressure steam valve 10. It should be further understood that at the extreme cold end of the temperature operating range, a yield spring 40 on rod 37 below swivel block 38 permits valve disc 31 to close orifice 33, the rod 37 being in sliding engagement with the block 38. The advantage of such a system is in both saving time and steam, which means fuel, hot water being available as soon as high pressure steam is on the heater, but no more high pressure steam is used than required to supplement that of the low pressure steam, which means exhaust steam from engines and auxiliary equipment. Furthermore, the available supply of exhaust steam is used to store up hot water in the storage tank when demand for such water is less than the available supply of exhaust steam thus avoiding exhausting the same to the atmosphere.

Fig. 5 illustrates another embodiment of the invention in which the two water temperatures, namely, the tank water and the heater water, lead to different sources. The two-temperature system is quite frequently required, for example, in institutions, such as hospitals; the colder water supply of, say 120 to 130 degrees, temperature being required for baths and showers, while a hotter supply of the order of 160 degrees or higher is necessary for use for dish-washing machines and for other purposes. In such an application, it is important to closely control the lower temperature source, in order that the inmates or patients be guarded against being injured by scalding water. It is less important to control the higher temperature source as this is generally supplied to a mixing valve having its own thermostat control.

For the above reasons, we have illustrated an embodiment of our invention in Fig. 5 differing somewhat from the species shown and described under other figure numbers, but still within the scope of our invention.

It will be noted that the thermostatically controlled valve is now shown a single orifice valve 45 and that the control for increasing the temperature of the water drawn from the tank is from conduit 15 through by-pass conduit 42 to mixing chamber 43 and that this by-pass line contains a check-valve 46 for preventing back flow in this conduit.

The hotter water drawn direct from the heater through conduit 15 and conduit 44 is through what is known as a cross valve. However, this is only a preferred arrangement as an angle valve could be used and conduit 44 taken off as a branch from conduit 15.

It will also be noted that Fig. 5 shows only high pressure steam control to the heater. However, the arrangement can be as shown in Fig. 1 where low pressure exhaust steam is available for this purpose.

While Fig. 1 and Fig. 5 both show an arrangement of cold water intake, also shown in Fig. 3, which we consider has some value for allowing a gravity recirculation of the water due to the difference in temperature within the heater shell and that of the storage tank, aided by the nozzle effect of the incoming cold water, yet if more convenient, this cold water connection could be made outside the tank at point we had designated as 47 and aperture 4 omitted.

The main object of the invention is to supply hot water of two temperatures, when required, with the least expenditure for material and units of heat for accomplishing the desired results.

From the description of the embodiments of the invention, it will be clear to those skilled in the art, that the basic principles of the invention which are sought to be protected may be applied in many different ways. One of the main features of the invention consists in that two temperatures of water or other liquids generated in a single-heat exchange system may be used independently where the requirements are for relatively high and low temperatures or they may be blended together under a single controlled temperature of the liquid. It thereby does not matter how the control of the two temperature liquids is accomplished. It may be done, for example, as shown in the different embodiments of the invention by thermostatically operated means or by manual throttling means in part or in whole.

While we have described our invention in great detail and with respect to two preferred embodiments thereof, we do not desire to be limited to such details or embodiments since many changes and modifications may be made and the invention embodied in other different forms of apparatus without departing from the spirit and scope thereof in its broader aspects. Hence we desire to cover all modifications, forms, and embodiments coming within the language or scope of any one or more of the appended claims.

We claim as our invention:

1. In combination a heat exchanger for hot water comprising, a storage tank, an instantaneous heater the shell of which extends within said tank, a plurality of return bend steam conveying tubes in heat transferring relations within said shell, a baffle plate extending parallel between the steam conveying tubes, a cold water inlet extending into the tank and entering the instantaneous heater at the bottom of the shell, an outlet from the heater to the tank at the top of the shell, and an outlet at the top of the shell outside the tank at a point where the water within the heater is in contact with the hotter portion of the said steam conveying tubes, and thermostatically operated means for controlling steam supply to the heater in accordance with the resultant temperature of water delivered at one or both of said hot water outlets.

2. In combination a heat exchanger for hot water and control therefor, comprising, a storage tank, an instantaneous heater the shell of which extends within said tank, a plurality of return bend steam conveying tubes in heat transferring relation with the water within said shell, a baffle plate extending parallel between the steam conveying tubes, a cold water inlet extending into the tank and entering the instantaneous heater at the bottom of the shell, an outlet aperture from the heater to the tank, at the top of the shell, and an outlet at the top of the shell outside the tank, a conduit connection for drawing hot water from the tank, a second conduit connecting the outlet outside the heater with that of the outlet conduit from the tank and thermostatically operated means responsive to the temperature in the first named conduit for operating a control valve in the last named conduit and additional means operated from the thermostatically operated means for controlling the steam supply to the heater.

3. In combination a heat exchanger for hot water and storage therefor, comprising, a storage tank, an instantaneous heater within said tank, an outside shell, a plurality U-bend steam conveying tubes extending into heat transferring relations with the water within said shell, a baffle plate extending parallel between the U-bend steam conveying tubes, an aperture in the shell near the colder portion of steam conveying tubes, a cold water inlet pipe having an end nozzle less in diameter than that of the pipe, said nozzle being of less diameter than that of the aperture in the shell, a second aperture relatively located on the opposite side of the shell, means for circulating water through the shell to the tank which flow is counter current to that of the steam in the tubes, a conduit for drawing hot water from the tank and a second conduit for drawing water of a higher temperature direct from the heater at a point where the water is in contact with the hotter portion of said coil and thermostatically operated means for controlling the steam supply to the heater in accordance with the resultant temperature of the water delivered at one or both of said hot water outlets.

4. In a heat exchanger and control therefor comprising in combination, a hot water storage tank, a heat exchanger for supplying hot water to said tank, steam supply line to said heat exchanger, a control valve in said line, a three-way hot water mixing valve, conduit connections from said mixing valve to both the tank and to said heat exchanger, a third conduit for the delivery of hot water, thermostatically operated means responsive to the temperature of the water in the last named conduit for operating the three-way valve and additional control means operated from the thermostatically operated means for controlling steam supply to the heat exchanger.

5. A heat exchanger and control therefor, comprising, in combination, a storage tank, a heat exchanger for supplying hot water to said tank, steam supply line to said heat exchanger, a control valve in said line, a three-way hot water mixing valve, conduit connections from said mixing valve to both the tank and to said heat exchanger, a third conduit for the delivery of hot water, thermostatically operated means responsive to the temperature in the last named conduit for operating the three-way valve, whereby a temperature above or below mean average in the delivery conduit will vary the flow from the tank and from the heater to maintain uniform temperature in the delivery conduit and additional control means operated from the thermostatically operated means for controlling the steam supply to the heat exchanger.

6. A heat exchanger and control therefor, comprising in combination, a storage tank, a heat exchanger for supplying hot water to said tank, a steam supply line to said heat exchanger, a control valve in said line, a three-way hot water mixing valve having inlet chambers at each end and an intermediate centered passage, a valve disc centrally located in said mixing valve passage and adapted to be moved to close off either one or the other end chambers, conduit connections from opposite end chambers to the tank and to the heat exchanger respectively, a third conduit for the delivery of hot water located at the central passage, thermostatic operated means responsive to the temperature in the last named conduit for operating the three-way valve, whereby a temperature above and below mean average in the delivery conduit will vary the flow from the tank and from the heat exchanger to maintain uniform temperature in the delivery conduit and additional control means operated from the thermostatically operated means for controlling the steam supply to the heat exchanger.

7. A heat exchanger and control therefor comprising, in combination, a storage tank, a heat exchanger for supplying hot water to said tank, a low and a high pressure steam supply line to the heat exchanger, control valves in said lines, a three-way hot water mixing valve having inlet chambers at each end and an intermediate central passage, a valve disc in said mixing valve passage adapted to be moved to close off either one or the other end chambers, said disc being slidably mounted on an operating stem and biased in one direction by resilient means, conduit connections from opposite end chambers to the tank and to the heat exchanger respectively, a third conduit located at the central passage, thermostatically controlled means responsive to the temperature in the last named conduit for operating the three-way mixing valve, said means comprising a servomotor, a pilot control element for controlling a source of fluid under pressure for operating the servomotor, a floating lever pivoted at an intermediate position to the pilot control valve, and at its end positions to the thermostat and to a member operated from the servomotor respectively, and additional means operated by said member for selectively controlling both the high and low pressure steam control valves to the heat exchanger.

8. A heat exchanger and control therefor comprising, in combination, a storage tank, a heat exchanger for supplying hot water to said tank, a low and a high pressure steam supply line to the heat exchanger, control valves in said lines, a three-way hot water mixing valve having inlet chambers at each end and an intermediate central passage, a valve disc in said mixing valve passage adapted to be moved to close off either one or the other end chambers, said disc being slidably mounted on an operating stem and biased in one direction by resilient means, conduit connections from opposite end chambers to the tank and to the heat exchanger respectively, a third conduit located at the central passage, thermostatically controlled means responsive to the temperature in the last named conduit for operating the three-way mixing valve, whereby a temperature above mean average in the delivery conduit will increase the flow from the tank and decrease the flow from the heat exchanger, and whereby a further rise in temperature will close the high pressure steam supply valve to the heater and the hot water supply from the exchanger to the three-way valve, and whereby a still further rise in temperature will close the low pressure steam valve to the heater.

9. In a hot water control system including a heat exchanger, steam supply line to said heat exchanger, a control valve in said line, a three-way hot water mixing valve, conduit connections from said valve to said heat exchanger, a second conduit connecting said valve with a source of water of less temperature than that of the heat exchanger, a third conduit for the delivery of hot water, thermostatically operated means responsive to the temperature of water in the last named conduit for operating the three-way hot water mixing valve and additional control means operated from the thermostatically operated means for controlling steam supply valve to the heat exchanger.

10. In a hot water control system including a heat exchanger, steam supply line to said heat exchanger, a control valve in said line, a three-way hot water mixing valve having inlet chambers at opposite ends and an intermediate central passage, a valve disc located in said passage and adapted to be moved to close off either one or the other end chambers, conduit connections from said valve to said heat exchanger, a second conduit connecting said valve with a source of water of less temperature than that of the heat exchanger, a third conduit for the delivery of hot water, thermostatic operated means responsive to the temperature of water in the last named conduit for operating the said valve disc and additional control means operated from the thermostatically operated means for controlling steam supply to the heat exchanger.

11. In a hot water control system including a heat exchanger, high and low pressure steam lines to said heat exchanger, control valves in each of said lines, a three-way hot water mixing valve having inlet chambers at opposite ends and an intermediate central passage, a valve disc located in said passage and adapted to be moved to close off either one or the other end chambers, conduit connections from said valve to said heat exchanger, a second conduit connecting said valve with a source of water of less temperature than that of the heat exchanger, a third conduit for the delivery of hot water, thermostatic operated means responsive to temperature of water in the last named conduit for operating the said valve disc and additional control means operated from the thermostatically operated means for selectively controlling both the high and low pressure steam valves to the heater.

12. In a hot water control system including a heat exchanger, high and low pressure steam connections to said heat exchanger, control valves in each of said connections, a three-way hot water mixing valve having inlet chambers at opposite ends and an intermediate central passage, a valve disc located in said passage and adapted to be moved to close off either one or the other end chambers, conduit connections from said valve to said heat exchanger, a second conduit connecting said valve with a source of water of less temperature than that of the water in the heat exchanger, a third conduit located at the intermediate passage for the delivery of hot water, thermostatic operated means responsive to temperature of the water in the last named conduit for operating the said valve disc, said means comprising a servomotor, a pilot control element for controlling a source of fluid under pressure for operating the servomotor, a floating lever pivoted at an intermediate position to the pilot control valve, and at its end positions to the thermostat and to a member operated from the servomotor respectively, and additional means operated from said member for selectively controlling both the high and low pressure steam control valves to the heat exchanger.

13. In a hot water system comprising in combination, a storage tank, an instantaneous heater the shell of which extends into said tank, return bend steam conveying tubes in heat transferring relation with water within said shell, a baffle plate extending parallel between the steam conveying tubes, a cold water inlet entering the instantaneous heater at the bottom of the shell, an outlet aperture from the heater to the tank at the top of the shell, a conduit for drawing hot water from the tank, a second conduit for drawing hot water of a higher temperature direct from the instantaneous heater outside the tank at a point where the water within the heater is in contact with the hotter portion of the steam conveying tubes, a by-pass conduit connecting the first and second named conduits, thermostatically operated means responsive to the temperature of the water in the first named conduit for controlling the flow of hot water in said by-pass and additional means operated from the thermostatically controlled means for controlling the steam supply to the heater.

14. In a hot water system comprising in combination, a storage tank, an instantaneous heater the shell of which extends within said tank, a plurality of return bend steam conveying tubes in heat transferring relation with the water within said shell, a baffle plate extending parallel between the steam conveying tubes, a cold water inlet entering the instantaneous heater at the bottom of the shell, an outlet aperture from the heater to the tank at the top of the shell, and an outlet at the top of the shell outside the tank at a point where the water within the heater is in contact with the hotter portion of the said steam conveying tubes, a conduit for drawing hot water from the tank, a second conduit for drawing hot water direct from the heater, a by-pass conduit connecting the first and second named conduits thermostatically operated means responsive to the temperature of the water in the first named conduit for controlling the flow of hot water in said by-pass conduit.

15. In a hot water system comprising in combination, a storage tank, an instantaneous heater the shell of which extends into said tank, return bend steam conveying tubes in heat transferring relations with water within said shell, a baffle plate extending parallel between the steam conveying tubes, a cold water inlet at the bottom of the shell at a point where the water within the shell is in contact with the coldest portion of the steam conveying tubes, an outlet aperture from the heater to the tank at the top of the shell at a point where the water within the heater is in contact with the hotter portion of the said steam conveying tubes, and an outlet at the top of the shell outside the tank, and thermostatically operated means for controlling steam supply to the steam conveying tubes in accordance with the resultant temperature of the water delivered at one or both of said hot water outlets.

ROY C. EARLEY.
JAMES L. KIMBALL.

REFERENCES CITED

The following references are of record in the file of this patent:

UNITED STATES PATENTS

| Number | Name | Date |
|---|---|---|
| Re. 19,488 | Russell et al. | Mar. 5, 1935 |